(12) United States Patent
Song et al.

(10) Patent No.: US 9,227,393 B2
(45) Date of Patent: *Jan. 5, 2016

(54) WETTING ENHANCEMENT COATING ON INTERMEDIATE TRANSFER MEMBER (ITM) FOR AQUEOUS INKJET INTERMEDIATE TRANSFER ARCHITECTURE

(71) Applicant: Xerox Corporation, Norwalk, CT (US)

(72) Inventors: Guiqin Song, Milton (CA); Gordon Sisler, St. Catharines (CA); Nan-Xing Hu, Oakville (CA); Marcel P. Breton, Mississauga (CA); Biby Esther Abraham, Mississauga (CA); Suxia Yang, Mississauga (CA); Gabriel Iftime, Cupertino, CA (US); Qi Zhang, Milton (CA)

(73) Assignee: Xerox Corporation, Norwalk, CT (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/219,125

(22) Filed: Mar. 19, 2014

(65) Prior Publication Data

US 2015/0266289 A1 Sep. 24, 2015

(51) Int. Cl.
*B41J 2/005* (2006.01)
*C09D 103/14* (2006.01)

(52) U.S. Cl.
CPC ............. *B41J 2/0057* (2013.01); *C09D 103/14* (2013.01)

(58) Field of Classification Search
None
See application file for complete search history.

(56) References Cited

U.S. PATENT DOCUMENTS

| 2005/0110855 | A1 | 5/2005 | Taniuchi et al. |
| 2006/0152566 | A1 | 7/2006 | Taniuchi et al. |
| 2006/0164488 | A1 | 7/2006 | Taniuchi et al. |
| 2007/0196580 | A1* | 8/2007 | Patil et al. ..................... 427/384 |
| 2007/0229639 | A1 | 10/2007 | Yahiro |
| 2010/0231671 | A1 | 9/2010 | Anton et al. |
| 2011/0018925 | A1 | 1/2011 | Ohara |
| 2015/0085036 | A1* | 3/2015 | Liu ............................... 347/101 |
| 2015/0085039 | A1* | 3/2015 | Liu ............................... 347/102 |

OTHER PUBLICATIONS

Notice of Allowance and Fee(s) Due for U.S. Appl. No. 13/716,892, dated Jul. 7, 2015, 10 pages.

* cited by examiner

*Primary Examiner* — Manish S Shah
*Assistant Examiner* — Renee I Wilson
(74) *Attorney, Agent, or Firm* — Hoffman Warnick LLC

(57) ABSTRACT

Described herein is a method and apparatus for ink jet printing. The method includes providing a wetting enhancement coating on a transfer member. The wetting enhancement coating (WEC) includes water, an acid treated, waxy maize cationic starch, a humectant and a surfactant. The wetting enhancement coating is dried or semi-dried to form a film. Ink droplets are ejected onto the film to form an ink image on the film. The ink image is dried and the ink image and film are transferred to a recording medium.

20 Claims, 3 Drawing Sheets

CATIONIC STARCH 39D        NON-CATIONIC STARCH

CATIONIC STARCH 39D        NON-CATIONIC STARCH

WETTING ENHANCEMENT COATING ON INTERMEDIATE TRANSFER MEMBER (ITM) FOR AQUEOUS INKJET INTERMEDIATE TRANSFER ARCHITECTURE

BACKGROUND

1. Field of Use

This disclosure is generally directed to inkjet transfix apparatuses and methods. In particular, disclosed herein is a method and composition that improves the wetting and release capability of an aqueous latex ink on low surface energy materials.

2. Background

Inkjet systems in which a liquid or melt solid ink is discharged through an ink discharge port such as a nozzle, a slit and a porous film are used in many printers due to their characteristics such as small size and low cost. In addition, an inkjet printer can print not only on paper substrates, but also on various other substrates such as textiles, rubber and the like.

During the printing process, various intermediate media (e.g., transfer belts, intermediate blankets or drums) may be used to transfer the formed image to the final substrate. In intermediate transfix processes, aqueous latex ink is inkjetted onto an intermediate blanket where the ink film is dried with heat. The dried image is subsequently transfixed on to the final paper substrate. For this process to properly operate, the intermediate blanket has to satisfy two conflicting requirements—the first requirement is that ink has to spread well on the blanket and the second requirement is that, after drying, the ink should release from the blanket. Since aqueous ink comprises a large amount of water, such ink compositions wet and spread very well on high energy (i.e., greater than 40 $mJ/m^2$) hydrophilic substrates. However, due to the high affinity to such substrates, the aqueous ink does not release well from these substrates. Silicone rubbers with low surface energy (i.e., about 20 $mJ/m^2$ or less) circumvent the release problem. However, a major drawback of the silicone rubbers is that, the ink does not wet and spread on these substrates due to low affinity to water. Thus, the ideal intermediate blanket for the transfix process would have both optimum spreading to form a good quality image and optimum release properties to transfix the image to paper. While some solutions, such as adding surfactants to the ink to reduce the surface tension of the ink, have been proposed, these solutions present additional problems. For example, the surfactants result in uncontrolled spreading of the ink that causes the edges of single pixel lines to be undesirably wavy. Moreover, aqueous printheads have certain minimum surface tension requirements (i.e., greater than 20 mN/m) that must be met for good jetting performance.

Thus, there is a need for a way to provide the desired spreading and release properties for aqueous inks to address the above problems faced in transfix process.

SUMMARY

Disclosed herein is a method for ink jet printing. The method includes providing a wetting enhancement coating on an intermediate transfer member. The wetting enhancement coating includes water, a cationic starch, a humectant and a surfactant. The wetting enhancement coating is dried to a film having a thickness of about 0.05 microns to about 5 microns. The method includes ejecting ink droplets to form an inkjet image on the film. The method includes transferring the inkjet image and the film onto a recording medium.

Described herein is an ink jet printer that includes a transfer member. A wetting enhancement station adjacent the transfer member provides a wetting enhancement coating on the transfer member. The wetting enhancement coating includes water, a cationic starch, a humectant and a surfactant. The printer includes a print head adjacent the transfer member that ejects ink droplets onto a film formed from the wetting enhancement coating to form ink images on the wetting enhancement coating. The printer includes a transfixing station located adjacent the transfer member and downstream from the print head, the transfixing station has a transfixing roll that forms a transfixing nip with the transfer member. The printer includes a transporting device for delivering a recording medium to the transfixing nip wherein the ink image and wetting enhancement coating are transferred to the recording medium.

Described herein is an ink jet printer that includes a transfer member. A wetting enhancement station adjacent the transfer member provides a wetting enhancement coating on the transfer member. The wetting enhancement coating includes water, a cationic starch, a humectant and a surfactant. The cationic includes more than 90 weight percent amylopectin having a positive charged moiety substituted for a hydroxyl group in the amylopectin. The printer includes a print head adjacent the transfer member that ejects ink droplets onto a film formed from the wetting enhancement coating to form ink images on the wetting enhancement coating. The printer includes a transfixing station located adjacent the transfer member and downstream from the print head, the transfixing station has a transfixing roll that forms a transfixing nip with the transfer member. The printer includes a transporting device for delivering a recording medium to the transfixing nip wherein the ink image and the film are transferred to the recording medium.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Figure 1:
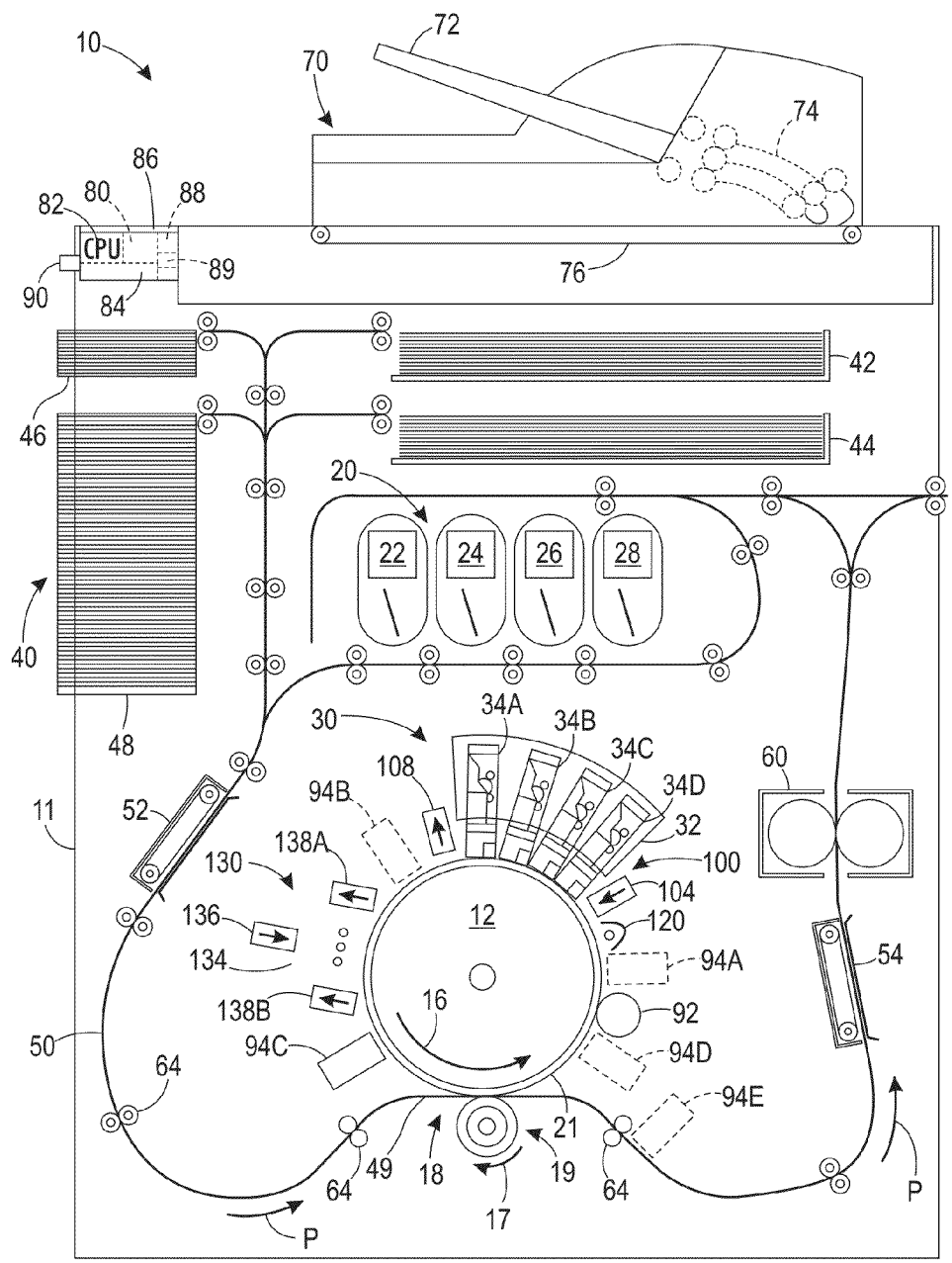
FIG. 1 is a schematic diagram illustrating an aqueous ink image printer.

FIG. 1 illustrates a high-speed aqueous ink image producing machine or printer 10. As illustrated, the printer 10 is an indirect printer that forms an ink image on a surface of a transfer member 12, (also referred to as a blanket or receiving member or image member) and then transfers the ink image to media passing through a nip 18 formed with the transfer member 12. The printer 10 includes a frame 11 that supports directly or indirectly operating subsystems and components, which are described below. The printer 10 includes the transfer member 12 that is shown in the form of a drum, but can also be configured as a supported endless belt. The transfer member 12 has an outer surface 21. The outer surface 21 is movable in a direction 16, and on which ink images are formed. A transfix roller 19 rotatable in the direction 17 is loaded against the surface 21 of transfer member 12 to form a transfix nip 18, within which ink images formed on the surface 21 are transfixed onto a media sheet 49.

The transfer member 12 can be of any suitable configuration. Examples of suitable configurations include a sheet, a film, a web, a foil, a strip, a coil, a cylinder, a drum, an endless strip, a circular disc, a drelt (a cross between a drum and a belt), a belt including an endless belt, an endless seamed flexible belt, and an endless seamed flexible imaging belt. The transfer member 12 can be a single layer or multiple layers.

The surface 21 of transfer member 12 is formed of a material having a relatively low surface energy to facilitate transfer of the ink image from the surface 21 to the media sheet 49 in the nip 18. Such materials include silicone, fluorosilicone, fluoroelastomers such as Viton®. Low energy surfaces, however, do not aid in the formation of good quality ink images as they do not spread ink drops as well as high energy surfaces. Disclosed in more detail below is a method and apparatus that improves the spreading ability of the ink to provide good ink images while allowing for proper release of the ink images onto the recording substrate 49.

Continuing with the general description, the printer 10 includes an optical sensor 94A, also known as an image-on-drum ("IOD") sensor, that is configured to detect light reflected from the surface 21 of the transfer member 12 and the coating applied to the surface 21 as the member 12 rotates past the sensor. The optical sensor 94A includes a linear array of individual optical detectors that are arranged in the cross-process direction across the surface 21 of the transfer member 12. The optical sensor 94A generates digital image data corresponding to light that is reflected from the surface 21. The optical sensor 94A generates a series of rows of image data, which are referred to as "scanlines," as the transfer member 12 rotates in the direction 16 past the optical sensor 94A. In one embodiment, each optical detector in the optical sensor 94A further comprises three sensing elements that are sensitive to frequencies of light corresponding to red, green, and blue (RGB) reflected light colors. The optical sensor 94A also includes illumination sources that shine red, green, and blue light onto the surface 21. The optical sensor 94A shines complementary colors of light onto the image receiving surface to enable detection of different ink colors using the RGB elements in each of the photodetectors. The image data generated by the optical sensor 94A is analyzed by the controller 80 or other processor in the printer 10 to identify the thickness of ink image and wetting enhancement coating (explained in more detail below) on the surface 21 and the area coverage. The thickness and coverage can be identified from either specular or diffuse light reflection from the blanket surface and coating. Other optical sensors, such as 94B, 94C, and 94D, are similarly configured and can be located in different locations around the surface 21 to identify and evaluate other parameters in the printing process, such as missing or inoperative inkjets and ink image formation prior to image drying (94B), ink image treatment for image transfer (94C), and the efficiency of the ink image transfer (94D). Alternatively, some embodiments can include an optical sensor to generate additional data that can be used for evaluation of the image quality on the media (94E).

The printer 10 also can include a surface energy applicator 120 positioned next to the surface 21 of the transfer member 12 at a position immediately prior to the surface 21 entering the print zone formed by printhead modules 34A-34D. The surface energy applicator 120 can be, for example, a corotron, a scorotron, or a biased charge roller. The surface energy applicator 120 is configured to emit an electric field between the applicator 120 and the surface 21 that is sufficient to ionize the air between the two structures and apply negatively charged particles, positively charged particles, or a combination of positively and negatively charged particles to the surface 21. The electric field and charged particles increase the surface energy of the blanket surface and coating. The increased surface energy of the surface 21 enables the ink drops subsequently ejected by the printheads in the modules 34A-34D to adhere to the surface 21 and coalesce.

The printer 10 includes an airflow management system 100, which generates and controls a flow of air through the print zone. The airflow management system 100 includes a printhead air supply 104 and a printhead air return 108. The printhead air supply 104 and return 108 are operatively connected to the controller 80 or some other processor in the printer 10 to enable the controller to manage the air flowing through the print zone. This regulation of the air flow helps prevent evaporated solvents and water in the ink from condensing on the printhead and helps attenuate heat in the print zone to reduce the likelihood that ink dries in the inkjets, which can clog the inkjets. The airflow management system 100 can also include sensors to detect humidity and temperature in the print zone to enable more precise control of the air supply 104 and return 108 to ensure optimum conditions within the print zone. Controller 80 or some other processor in the printer 10 can also enable control of the system 100 with reference to ink coverage in an image area or even to time the operation of the system 100 so air only flows through the print zone when an image is not being printed.

The high-speed aqueous ink printer 10 also includes an aqueous ink supply and delivery subsystem 20 that has at least one source 22 of one color of aqueous ink. Since the illustrated printer 10 is a multicolor image producing machine, the ink delivery system 20 includes four (4) sources 22, 24, 26, 28, representing four (4) different colors CYMK (cyan, yellow, magenta, black) of aqueous inks. In the embodiment of FIG. 1, the printhead system 30 includes a printhead support 32, which provides support for a plurality of printhead modules, also known as print box units, 34A through 34D. Each printhead module 34A-34D effectively extends across the width of the intermediate transfer member 12 and ejects ink drops onto the surface 21. A printhead module can include a single printhead or a plurality of printheads configured in a staggered arrangement. Each printhead module is operatively connected to a frame (not shown) and aligned to eject the ink drops to form an ink image on the surface 21. The printhead modules 34A-34D can include associated electronics, ink reservoirs, and ink conduits to supply ink to the one or more printheads. In the illustrated embodiment, conduits (not shown) operatively connect the sources 22, 24, 26, and 28 to the printhead modules 34A-34D to provide a supply of ink to the one or more printheads in the modules. As is generally familiar, each of the one or more printheads in a printhead module can eject a single color of ink. In other embodiments, the printheads can be configured to eject two or more colors of ink. For example, printheads in modules 34A and 34B can eject cyan and magenta ink, while printheads in modules 34C and 34D can eject yellow and black ink. The printheads in the illustrated modules are arranged in two arrays that are offset, or staggered, with respect to one another to increase the resolution of each color separation printed by a module. Such an arrangement enables printing at twice the resolution of a printing system only having a single array of printheads that eject only one color of ink. Although the printer 10 includes four printhead modules 34A-34D, each of which has two arrays of printheads, alternative configurations include a different number of printhead modules or arrays within a module.

After the printed image on the surface 21 exits the print zone, the image passes under an image dryer 130. The image dryer 130 includes an infrared heater 134, a heated air source 136, and air returns 138A and 138B. The infrared heater 134 applies infrared heat to the printed image on the surface 21 of the transfer member 12 to evaporate water or solvent in the ink. The heated air source 136 directs heated air over the ink to supplement the evaporation of the water or solvent from the ink. The air is then collected and evacuated by air returns 138A and 138B to reduce the interference of the air flow with other components in the printing area.

As further shown, the printer 10 includes a recording media supply and handling system 40 that stores, for example, one or more stacks of paper media sheets of various sizes. The recording media supply and handling system 40, for example, includes sheet or substrate supply sources 42, 44, 46, and 48. In the embodiment of printer 10, the supply source 48 is a high capacity paper supply or feeder for storing and supplying image receiving substrates in the form of cut media sheets 49, for example. The recording media supply and handling system 40 also includes a substrate handling and transport system 50 that has a media pre-conditioner assembly 52 and a media post-conditioner assembly 54. The printer 10 includes an optional fusing device 60 to apply additional heat and pressure to the print medium after the print medium passes through the transfix nip 18. In one embodiment, the fusing device 60 adjusts a gloss level of the printed images that are formed on the print medium. In the embodiment of FIG. 1, the printer 10 includes an original document feeder 70 that has a document holding tray 72, document sheet feeding and retrieval devices 74, and a document exposure and scanning system 76.

Operation and control of the various subsystems, components and functions of the machine or printer 10 are performed with the aid of a controller or electronic subsystem (ESS) 80. The ESS or controller 80 is operably connected to the image receiving member 12, the printhead modules 34A-34D (and thus the printheads), the substrate supply and handling system 40, the substrate handling and transport system 50, and, in some embodiments, the one or more optical sensors 94A-94E. The ESS or controller 80, for example, is a self-contained, dedicated mini-computer having a central processor unit (CPU) 82 with electronic storage 84, and a display or user interface (UI) 86. The ESS or controller 80, for example, includes a sensor input and control circuit 88 as well as a pixel placement and control circuit 89. In addition, the CPU 82 reads, captures, prepares and manages the image data flow between image input sources, such as the scanning system 76, or an online or a work station connection 90, and the printhead modules 34A-34D. As such, the ESS or controller 80 is the main multi-tasking processor for operating and controlling all of the other machine subsystems and functions, including the printing process discussed below.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image data for an image to be produced are sent to the controller 80 from either the scanning system 76 or via the online or work station connection 90 for processing and generation of the printhead control signals output to the printhead modules 34A-34D. Additionally, the controller 80 determines and/or accepts related subsystem and component controls, for example, from operator inputs via the user interface 86, and accordingly executes such controls. As a result, aqueous ink for appropriate colors are delivered to the printhead modules 34A-34D. Additionally, pixel placement control is exercised relative to the surface 21 to form ink images corresponding to the image data, and the media, which can be in the form of media sheets 49, are supplied by any one of the sources 42, 44, 46, 48 and handled by recording media transport system 50 for timed delivery to the nip 18. In the nip 18, the ink image is transferred from the surface 21 of the transfer member 12 to the media substrate within the transfix nip 18.

In some printing operations, a single ink image can cover the entire surface 21 (single pitch) or a plurality of ink images can be deposited on the surface 21 (multi-pitch). In a multi-pitch printing architecture, the surface 21 of the transfer member 12 (also referred to as image receiving member) can be partitioned into multiple segments, each segment including a full page image in a document zone (i.e., a single pitch) and inter-document zones that separate multiple pitches formed on the surface 21. For example, a two pitch image receiving member includes two document zones that are separated by two inter-document zones around the circumference of the surface 21. Likewise, for example, a four pitch image receiving member includes four document zones, each corresponding to an ink image formed on a single media sheet, during a pass or revolution of the surface 21.

Once an image or images have been formed on the surface under control of the controller 80, the illustrated inkjet printer 10 operates components within the printer to perform a process for transferring and fixing the image or images from the surface 21 to media. In the printer 10, the controller 80 operates actuators to drive one or more of the rollers 64 in the media transport system 50 to move the media sheet 49 in the process direction P to a position adjacent the transfix roller 19 and then through the transfix nip 18 between the transfix roller 19 and the surface 21 of transfer member 12. The transfix roller 19 applies pressure against the back side of the recording media 49 in order to press the front side of the recording media 49 against the surface 21 of the transfer member 12. Although the transfix roller 19 can also be heated, in the embodiment of FIG. 1, the transfix roller 19 is unheated. Instead, the pre-heater assembly 52 for the media sheet 49 is provided in the media path leading to the nip. The pre-conditioner assembly 52 conditions the media sheet 49 to a predetermined temperature that aids in the transferring of the image to the media, thus simplifying the design of the transfix roller. The pressure produced by the transfix roller 19 on the back side of the heated media sheet 49 facilitates the transfixing (transfer and fusing) of the image from the transfer member 12 onto the media sheet 49.

The rotation or rolling of both the transfer member 12 and transfix roller 19 not only transfixes the images onto the media sheet 49, but also assists in transporting the media sheet 49 through the nip. The transfer member 12 continues to rotate to continue the transfix process for the images previously applied to the coating and blanket 12.

As shown and described above the transfer member 12 or image receiving member initially receives the ink jet image. After ink drying, the transfer member 12 releases the image to the final print substrate during a transfer step in the nip 18. The transfer step is improved when the surface 21 of the transfer member 12 has a relatively low surface energy. However, a surface 21 with low surface energy works against the desired initial ink wetting (spreading) on the transfer member 12. Unfortunately, there are two conflicting requirements of the surface 21 of transfer member 12. The first aims for the surface to have high surface energy causing the ink to spread and wet (i.e. not bead-up). The second requirement is that the ink image once dried has minimal attraction to the surface 21 of transfer member 12 so as to achieve maximum transfer efficiency (target is 100%), this is best achieved by minimizing the surface 21 surface energy.

To be more specific, the transfer member 12 materials that release the best are among the classes of silicone, fluorosilicone, and fluoroelastomers such as Viton®. They all have low surface energy but provide poor ink wetting. Alternatively, polyurethane and polyimide, may wet very well but do not give up the ink easily.

By providing a wetting enhancement coating (WEC) and drying the coating to form a higher surface energy coating on the surface 21 of the transfer member 12, improved wetting of the ink image on the transfer member 12 is obtained. The ink image is applied to the wetting enhancement coating film. The dried film is incompatible with the ink and/or is thick enough to avoid the coating being re-dissolved into the ink.

Returning to FIG. 1, a surface maintenance unit (SMU) 92 include a coating station such as coating applicator, a metering blade, and, in some embodiments, a cleaning blade. The coating applicator can further include a reservoir having a fixed volume of wetting enhancement fluid and a resilient donor member, which can be smooth or porous and is mounted in the reservoir for contact with the wetting enhancement coating material and the metering blade. The wetting enhancement coating is applied to the surface 21 of transfer member 12 to form a thin layer on the surface 21. The SMU 92 is operatively connected to a controller 80, to enable the controller to operate the donor member, metering blade and cleaning blade selectively to deposit and distribute the coating material onto the surface 21 of transfer member 12. The SMU 92 can include a dryer positioned between the coating station and the print head to increase to film formation of the wetting enhancement coating.

After transfer, the WEC and ink are fixed to the recording media 49 with the WEC acting as a protective image overcoat. Another advantage of the WEC is that it eliminates potential life issues associated with the transfer member 12 after many paper touches since the WEC always "refreshes" the surface 21 of the transfer member 12 after each print cycle.

The sacrificial Wetting Enhancement Coating (WEC) is described. The aqueous (WEC) fluid coating is applied to the surface 21 where it dries to form a solid film. The coating will have a higher surface energy and/or be more hydrophilic than the surface 21 of transfer member 12. In addition, the coating does not re-dissolve in the ink before the ink droplets dry.

In embodiments, the WEC includes; water, a pre-gelatinized cationic starch, a humectant and a surfactant. The wetting enhancement coating is semi-dried or dried to form a film having a thickness of from about 0.05 microns to about 5 microns, or in embodiments, 0.05 microns to about 2 microns.

The cationic starch used in the present invention preferably is acid treated waxy maize or waxy-type corn starch; however, other waxy maize starches are also within the range of selection.

In embodiments, the following WEC solution examples are all prepared with cationic acid treated waxy maize corn starch The cationic starch is composed of amylopectin as shown in Structure 1 below.

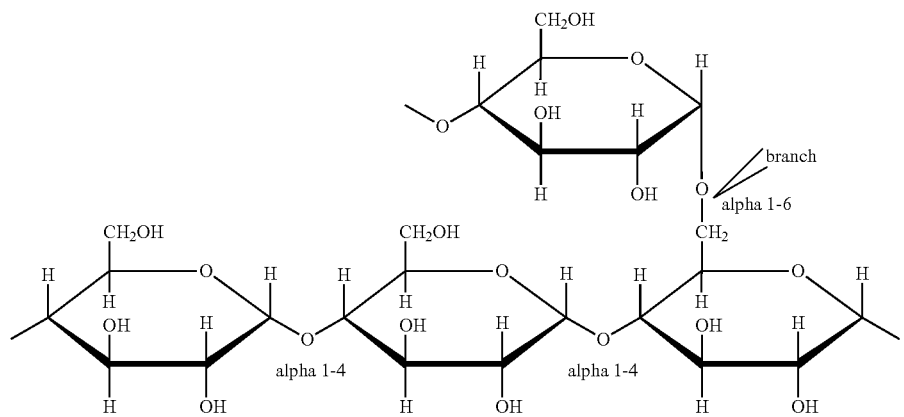

Structure 1 has about one α-1,6 linkage for every 12 to 30 α-1,4 linkages unit $(C_6H_{12}O_6)_m$, where m is from 12 to 30.

A portion of the hydroxyl group (—OH) is substituted by a positive charged moiety such as a by Structure 2.

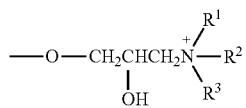

Structure 2 wherein $R_1$, $R_2$ and $R_3$ each, independently of the others, are hydrogen, alkyl, aryl and alkylaryl. In embodiments, the positive charged moiety of the cationic starch is a tertiary or quaternary ammonium compound which is usually obtained by reaction of starch with tertiary or quaternary amines, including 2.3-epoxy propyl trimethyl ammoniumchloride and (3-chloro-2-hydroxypropyl)trimethyl ammonium chloride. The positive charged moiety reacted with the amylopectin forms hyperbranched amylopectin derivatives.

In embodiments the cationic starch is represented by the structure below.

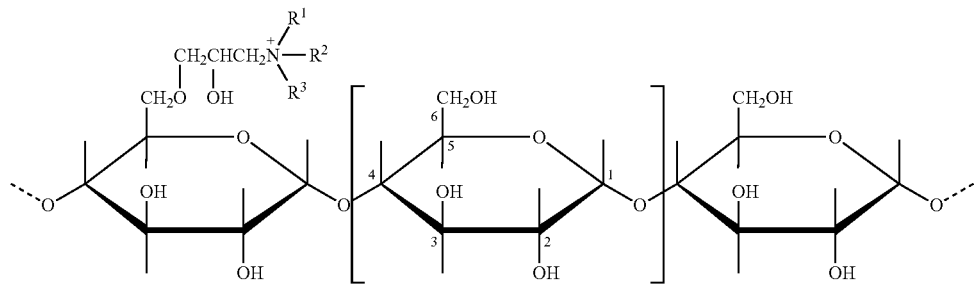

wherein $R_1$, $R_2$ and $R_3$ are as described above.

Starch gelatinization is a process that breaks down the intermolecular bonds of starch molecules in the presence of water and heat, allowing the hydrogen bonding sites (the hydroxyl hydrogen and oxygen) to engage more water. This irreversibly dissolves the starch granule. The cationic starch slurry was prepared with deionized water having solid content from about 1 weight percent to about 35 weight percent. Then the starch slurry is gelatinized, or cooked out, either in a batch process or by a jet cooker. For batch process, the starch slurry was heated from about 93° C. to about 98° C. and was kept at this temperature for about 15 minutes to about 20 minutes.

Cationization of the starch is measured by the "degree of substitution" (DS). The degree of substitution indicates the average number of hydroxyl groups on each anhydroglucose unit. The nitrogen content in the cationic starch is about 0.1 weight percent to about 0.60 weight percent based on the starch component. In embodiments, the nitrogen content is from about 0.2 weight percent to about 0.55 weight percent or from about 0.25 weight percent to about 0.50 weight percent based on the starch component Tunable ink drop spreading can be controlled by adjusting the positive charging moiety amount in the formulation. The amount of positive charged moiety is measured by nitrogen level in starch Ink draw back and color bleeding during drying process can be effectively controlled by cationic functional group so that the image quality gets improved. In embodiments the cationic starch, with optional surfactants and optional humectants were applied onto silicone or fluorinated rubber substrate as described in the Examples.

In embodiments, a hydroscopic humectant can be added to the WEC. The amount of humectant from about 1 weight percent of the dry WEC to about 8 weight percent of the dry WEC. In embodiments the humectant is selected from the group consisting of glycerol, sorbitol and glycols. In embodiments the weight ratio of humectant to cationic starch is from about 1:1 to 5:1.

In embodiments, a surfactant is added to the WEC. The amount of surfactant is from about 0.01 weight percent of the dry WEC to about 2.0 weight percent of the dry WEC. Suitable surfactants include anionic surfactants (such as sodium lauryl sulfate (SLS), Dextrol OC-40, Strodex PK 90, ammonium lauryl sulfate, potassium lauryl sulfate, sodium myreth sulfate and sodium dioctyl sulfosuccinate series), non ionic surfactants (sulfynol 104 series, sulfynol 400 series, dynol 604, dynol 810, envirogem 360, secondaryl alcohol ethoxylate series such as Tergitol 15-s-7, tergitol 15-s-9, TMN-6, TMN-100x and tergitol NP-9, Triton X-100 etc.) and cationic surfactants. (Chemguard S-106A, Chemguard S-208M, Chemguard S-216M. Some fluorinated or silicone surfactant can be used in system such as PolyFox TMPF-136A, 156A, 151N Chemguard S-761p, S-764p Silsurf A008, Siltec C-408, BYK 345, 346, 347, 348 and 349. Polyether siloxanne copolymer TEGO Wet-260, 270 500 etc. Some amphoteric fluorinated surfactants can also be used such as alkyl betaine fluorosurfactant or alkyl amine oxide fluorosurfactant such as Chemguard S-500 Chemguard S-111.

In embodiments, a biocide is added to the WEC. The biocides suitable in the WEC include ACTICIDES® CT, ACTICIDES® LA 1209 and ACTICIDES® MBS. The amount of biocide in the WEC is from about 0.1 weight percent to about 2 weight percent.]

The WEC forms a durable coating that has a dry thickness of from about 0.1 micron to about 5 microns, or from about 0.1 microns to about 2.0 microns or from about 0.2 microns to about 0.7 microns. The wetting enhancement coating has a higher surface energy than the surface 21 of the transfer member 12. In embodiments, the surface energy of the wetting enhancement coating after drying is from about 16 mN/m to about about 30 mN/m. The viscosity of wetting enhancement coating during application is less than 500 cps at 10 percent solid weight percent at room temperature. The wetting enhancement coating is coated at a temperature of from about 50° C. to about 120° C. The pH of the enhancement coating is from 5 to 10. The solid content of the enhancement coating is from about 1 weight percent to about 10 weight percent.

Specific embodiments will now be described in detail. These examples are intended to be illustrative, and not limited to the materials, conditions, or process parameters set forth in these embodiments. All parts are percentages by solid weight unless otherwise indicated.

EXAMPLES

The following WEC formulations were prepared and tested. All the Examples performed similarly in the coatings experiments described below.

Example 1

A 10 percent Cargill+39D starch, which is a waxy maize cationic corn starch, was added into deionized water at room temperature. The cationic starch slurry was gelatinized by heating to the temperature of from about 93° C. to about 98° C. The cationic starch slurry was kept at this temperature for about 15 minutes to about 20 minutes then the gelatinized starch was cooled to room temperature. The WEC solution was prepared by combining and mixing 15 g of the 10 percent Cargill+39D solution and 5 g glycerol into 79.9 g of deionized water. Next, 0.1 g of sodium lauryl sulfate (SLS) surfactant was added to the mixture to make 100 g of solution.

Example 2

A 10 percent cationic starch Cargill+34D was gelatinized as in Example 1. The WEC solution was prepared by combining and mixing 13.5 g 10 percent Cargill+34D solution and 5 g glycerol into 81.4 g of deionized water. Next, 0.1 g sodium lauryl sulfate (SLS) surfactant was added into the mixture to make 100 g of solution.

Example 3

A 10 percent cationic starch Cargill+34D was gelatinized as in Example 1. The WEC solution was prepared by combining and mixing 15 g 10 percent Cargill+39D solution and 5 g glycerol into 79.9 g deionized water. Next, 0.1 g Strodex PK 90 was added into the mixture to make 100 g of solution.

Example 4

A 20 percent cationic starch Cargill+34D was gelatinized as in Example 1. The WEC solution was prepared by combining and mixing 7.5 g 10 percent Cargill+39D solution and 5 g glycerol into 87.4 g deionized water. Next, 0.1 g Strodex PK 90 was added into the mixture to make 100 g of solution.

Example 5

A 20 percent cationic starch Cargill+34D was gelatinized as in Example 1. The WEC solution was prepared by combining and mixing 30 g 10 percent Cargill+34D solution into 69 g deionized water. Next, 1 g Triton TX-100 surfactant was added into the mixture to make 100 g of solution.

The WEC formulation of Examples 1 was diluted to 1.5%. 5% glycerol was added into the coating A number 2.5 Meyer rod was used to coat the cationic starch solution on a Biaxially Oriented Polypropylene (BOPP) film or Viton film which was made from Viton GF with AO700 crosslinker. The wet film thickness was from about 6 microns to about 7 microns. The coated film was dried in oven at 60° C. for 30 seconds. The dry film thickness was about 100 nm to about 300 nm.

Figure 2:
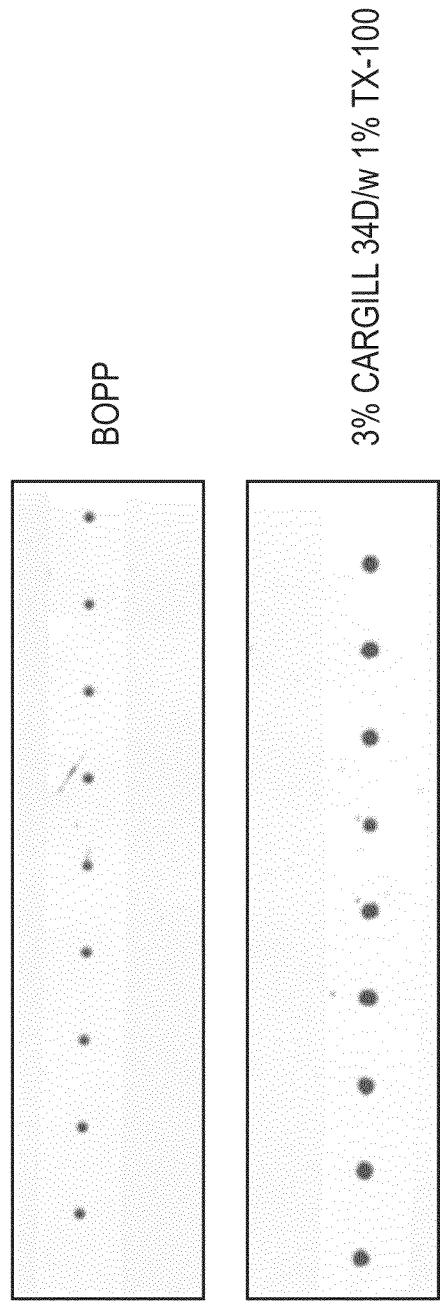
FIG. 2 shows pictures of the ink drops and their spread for the uncoated BOPP and WEC coated BOPP.

The contact angle of ink on cationic starch WEC was measured using Fibro DAT1100 instrument. The contact angle was continuously measured with time. The earliest image which can be captured is 20 milliseconds. The contact angel of the WEC on BOPP was between about 28° and 38°. The uncoated BOPP had a contact angle of greater than 60°. The higher the contact angle, the less the spread of the ink. The spread of the ink drops was improved substantially using the WEC coated BOPP. FIG. 2 shows pictures of the ink drops and their spread for the uncoated and coated BOPP. The drops spread much better with the coated BOPP under identical conditions.

The printing was done with a laboratory black ink. The conditions for the printing included: Ink drop mass: 6.8 ng; Ink drop velocity: 10 m/s; Frequency: 5 KHz; Voltage: 19 V. The printing blanket included of coatings of cationic starch solutions and corresponding non-cationic starch comparative examples. The Viton blanket was maintained at a temperature of 40° C. during the printing of dots and lines patterns. The drop Jetting experiments were conducted and show a dramatic improvement in wetting and image quality as described in more detail below. The transfer to paper at about 110° C. was nearly 100 percent.

Figure 3:
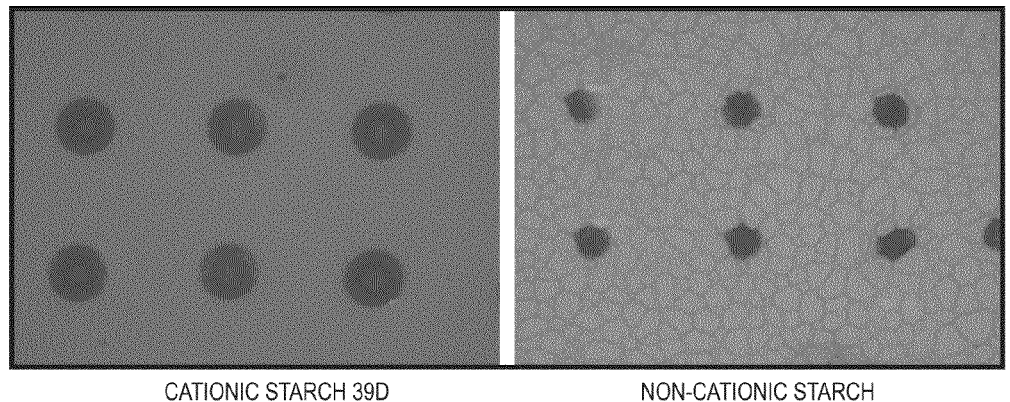
FIG. 3 shows pictures of the ink drops and their spread on a silicone blanket with WEC formulations described herein and non-cationic starch WEC formulations.
Figure 4:
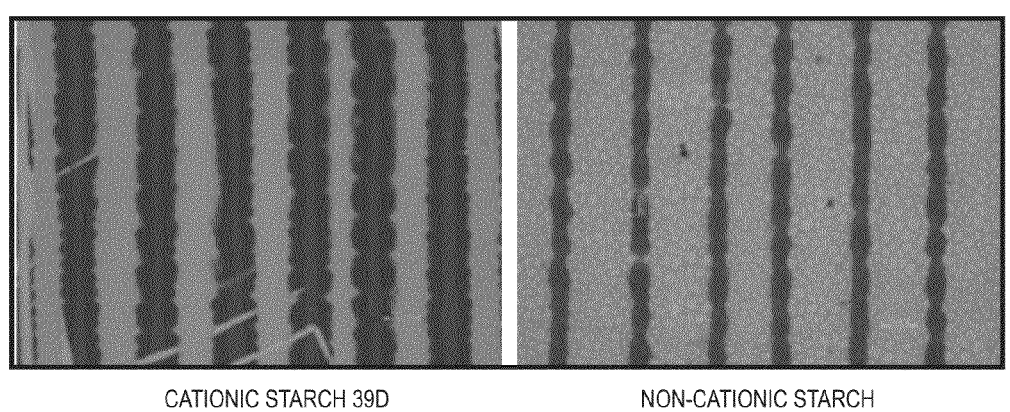
FIG. 4 shows pictures of a silicone blanket having the fluid layer applied and their spread on the surface of the silicone blanket with WEC formulations described herein and non-cationic starch WEC formulations.

FIG. 3 shows pictures of the ink drops and their spread on a silicone blanket with ink jet drops applied onto the surface. A starch as described above is compared with a non-cationic starch used in the WEC formulation. The size of the dots was about 75 microns for the WEC disclosed herein, while the dot size was about 50 for the comparative WEC. FIG. 4 shows a silicone blanket having the fluid layer described above applied on the surface of the silicone blanket. The same ink jet drops were applied to the surface of the blanket having a dried WEC as in FIGS. 2 and 3 and are shown in FIG. 4. The width of the lines was about 120 microns for the WEC disclosed herein, while the line width was about 58 for the comparative WEC. Thus, the WEC disclosed herein shows better spreading than other WECs. As can clearly be seen in the comparison between FIGS. 3 and 4, the wetting enhancement coating provides ink jet shapes that do not bead.

Another laboratory ink was applied on cationic starch coated Viton using an air brush. The transfer conditions were as 99° C., 50 psi and 5 seconds dwell time. The ink was 100 percent transferred from cationic starch coated Viton to Digital Elite Gloss coated paper.

Printing tests were conducted on WEC coated BOPP and uncoated BOPP. An HP office jet 4200 printer was used to print the uncoated and cationic starch coated BOPP. The cationic starch coated BOPP provided superior image quality.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled in the art which are also encompassed by the following claims.

What is claimed is:

1. A method for transfix ink jet printing comprising:
   coating a wetting enhancement coating on a transfer member, wherein the wetting enhancement coating comprises; water, a cationic starch, a humectant and a surfactant;
   drying the wetting enhancement coating to form a film having a thickness of from about 0.05 microns to about 5 microns;
   ejecting ink droplets to form an inkjet image on the film; and
   transferring the inkjet image and the film onto a recording medium.

2. The method of claim 1, wherein the cationic starch comprises more than 90 weight percent amylopectin having a positive charged moiety substituted for a hydroxyl group in the amylopectin.

3. The method of claim 2, wherein the amylopectin is represented by:

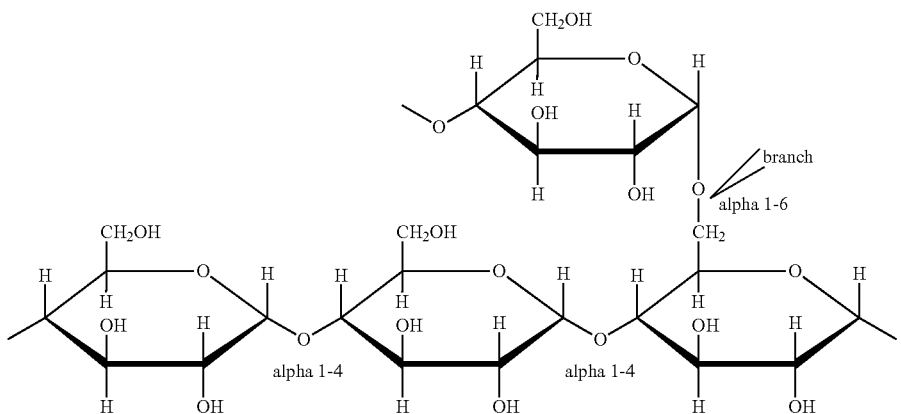

wherein there is 1 α-1,6 linkage for every 12 to 30 α-1,4 linkages for a unit $(C_6H_{12}O_6)_m$ and where m equals 12 to 30.

4. The method of claim 2, wherein the amylopectin having a positive charged moiety substituted is represented by:

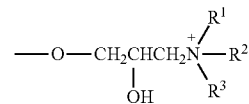

wherein $R_1$, $R_2$ and $R_3$ are hydrogen, alkyl, aryl and alkylaryl.

5. The method of claim 4, wherein the nitrogen level in the positive charged moiety substituted cationic starch is from about 0.1 percent to about 0.6 percent.

6. The method of claim 1, wherein a weight percent of the cationic starch in the wetting enhancement coating is from about 1 weight percent to about 10 weight percent.

7. The method of claim 1, wherein the humectant in wetting enhancement coating is selected from the group consisting of glycerol, sorbitol, glycols and mixtures thereof.

8. The method of claim 1, wherein a weight percent of the humectant in the wetting enhancement coating is from about 1 weight percent to about 8 weight percent.

9. The method of claim 1, wherein a weight percent of the wetting enhancement coating further comprises a biocide in an amount of from about 0.1 weight percent to about 2 weight percent.

10. The method of claim 1, wherein the transfer member has surface free energy from 16 to 30 mN/m.

11. The method of claim 1, wherein the surfactant is selected from the group consisting of anionic surfactants, non-ionic surfactants and cationic surfactants from about 0.1 weight percent to about 2.0 weight percent of the wetting enhancement coating.

12. The method of claim 1, wherein the viscosity of cationic starch is less than 500 cps at 10 percent solid weight percent at room temperature.

13. The method of claim 1, wherein a weight ratio of humectant to cationic starch in wetting enhancement coating is from 1:1 to 5:1.

14. An ink jet printer comprising: a transfer member; a wetting enhancement coating station adjacent said transfer member that provides a wetting enhancement coating on the transfer member wherein the wetting enhancement coating comprises; water, a cationic starch, a humectant and a surfactant; a drying station adjacent said transfer member for drying the wetting enhancement coating to form a film on the transfer member; a print head adjacent said transfer member that ejects aqueous ink droplets onto the film; a transfixing station located adjacent said transfer member and downstream from said print head, the transfixing station having a transfixing roll forming a transfixing nip therewith at said transfixing station; a transporting device for delivering a recording medium to the transfixing nip wherein the ink image and film are transferred to the recording medium.

15. The inkjet printer of claim 14, wherein the cationic starch comprises more than 90 weight percent amylopectin having a positive charged moiety substituted for a hydroxyl group in the amylopectin.

16. The inkjet printer of claim 14, wherein the amylopectin is represented by:

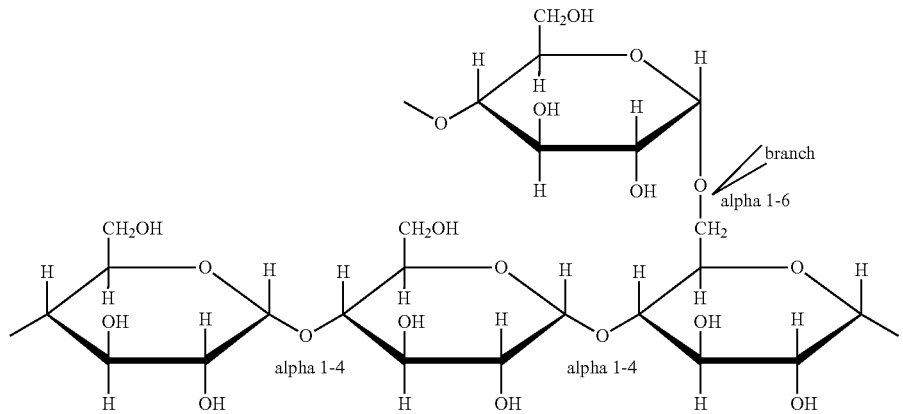

wherein there is 1 α-1,6 linkage for every 12 to 30 α-1,4 linkages for a unit $(C_6H_{12}O_6)_m$ and where m equals 12 to 30.

17. The inkjet printer of claim 16, wherein the amylopectin having a positive charged moiety substituted is represented by:

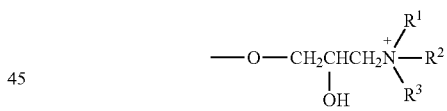

wherein $R_1$, $R_2$ and $R_3$ are hydrogen, alkyl, aryl and alkylaryl.

18. The inkjet printer of claim 17, wherein the nitrogen level in the positive charged moiety substituted cationic starch is from about 0.1 percent to about 0.6 percent.

19. The inkjet printer of claim 14, wherein the amylopectin having a positive charged moiety substituted is represented by:

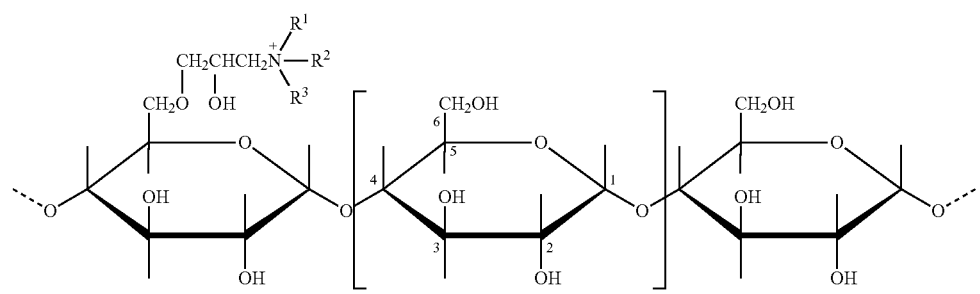

20. An ink jet printer comprising: a transfer member; a wetting enhancement coating station adjacent said transfer member that provides a wetting enhancement coating on the transfer member wherein the wetting enhancement coating comprises; water, a cationic starch, a humectant and a surfactant wherein the cationic starch comprises more than 90 weight percent amylopectin having a positive charged moiety substituted for a hydroxyl group in the amylopectin; a drying station adjacent said transfer member for drying the wetting enhancement coating to form a film on the transfer member; a print head adjacent said transfer member that ejects aqueous ink droplets onto the film; a transfixing station located adjacent said transfer member and downstream from said print head, the transfixing station having a transfixing roll forming a transfixing nip therewith at said transfixing station; a transporting device for delivering a recording medium to the transfixing nip wherein the ink image and film are transferred to the recording medium.

* * * * *